United States Patent [19] [11] Patent Number: 4,847,797
Picchi et al. [45] Date of Patent: Jul. 11, 1989

| | | | |
|---|---|---|---|
| [54] | ADAPTIVE BLIND EQUILIZATION METHOD AND DEVICE | 4,547,889 10/1985 Picchi et al. ............... 375/15 | |
| | | 4,564,952 1/1986 Karabinis et al. ............... 375/14 | |
| [75] | Inventors: Giorgio Picchi, Sarzana; Giancarlo Prati, Pisa, both of Italy | | |

Primary Examiner—Joseph Ruggiero
Attorney, Agent, or Firm—Cushman, Darby & Cushman

[73] Assignee: GTE Telecommicazioni S.P.A., Milan, Italy

[57] ABSTRACT

[21] Appl. No.: 19,563

[22] Filed: Feb. 27, 1987

[30] Foreign Application Priority Data

Mar. 25, 1986 [IT] Italy ............... 19866 A/86

[51] Int. Cl.$^4$ ............... G06V 1/00; H04B 3/04
[52] U.S. Cl. ............... 364/602; 333/18; 364/724.2; 375/15
[58] Field of Search ............... 364/602, 604, 607, 825, 364/724, 724.2; 375/12–16; 333/99–104, 18, 28 R, 166, 167

[56] References Cited

U.S. PATENT DOCUMENTS 4,021,738 5/1977 Gitlin et al. ............... 375/14
4,027,258 5/1977 Perreault ............... 375/12 X
4,438,521 3/1984 Mattei ............... 375/16

An adaptive blind equalization method and device uses self-decisions both in the convergence phase and the steady-state phase, making it possible to obtain a good and smooth adaptation in the convergence phase and a low error probability for the decided symbols in the steady state phase. By using the self-decided error and a reference error, a binary consent function is constructed which tells when it is allowed to proceed with the adaptation and when the adaptation should not be used. The binary consent function compares the self-decided error sign with the reference error sign and is based on the discovery that in certain areas of the symbol constellation plane, when the signs of the previous errors are equal, there is a high probability that the self-decided error signs and true error signs (unknown) will also be equal.

43 Claims, 3 Drawing Sheets

ADAPTIVE BLIND EQUILIZATION METHOD AND DEVICE

BACKGROUND OF THE INVENTION

1. Field of the Art

The present invention relates to the field of digital transmission and more particularly to a method of adaptive blind equalization for the reception of electrical signals codified in symbols and transmitted on a transmission channel of unknown characteristics variable in time which introduces an intersymbol interference. The reception device uses a filter with adaptable parameters at the output of which there are signal samples, a decision element which assigns to each signal sample a symbol, and a control device. On the basis of a pilot vector of received signals, signal samples, and decided symbols adjustments are made to the adaptable parameters of the filter until an optimal configuration is reached which gives the least intersymbol interference.

2. Background of the Prior Art

In synchronous data transmission systems, because of the non-ideality of the frequency response of the transmission channels, each transmitted symbol interferes with the others, generating an intersymbol interference. To attenuate the intersymbol interference, the systems are usually equipped with equalizers (see Lucky R. W., "Automatic equalization for digital communication", Bell Syst. Tech. J., 1965, 44, pp. 574–588).

Such equalizers, referred to as transversal, are made with a chain of delay elements, at the output of each of which is placed a variable gain amplifier (tap gain). The tap gain outputs are then added to provide a signal sample which gives an indication of the transmitted symbol. This signal sample is then sent to a decision element to obtain a decided signal. Assuming no errors, the decided signal should be equal to the signal fed into the transmission channel.

By appropriate selection of the delay elements and the tap gains, transversal equalizers can reduce the intersymbol interference according to a given criterion. Some types of equalizers, referred to as adaptive, have an automatic tap gain control and adjustment system. In these equalizers, starting from arbitrary initial tap gain values, even quite far from the optimum, can be modified iteratively until an optimal configuration is reached and held by slow variations of the transmission channel characteristics.

To minimize intersymbol interference many adaptive (self-learning) equalization systems adopt the criterion of minimizing the mean square error (MSE) between the signal samples at the equalizer output before the decision and the corresponding transmitted signals using estimated gradient methods. For a given transmission channel, the mean square error is a quadratic function of the tap gains. The mean square error is minimized by estimating its gradient on the basis of the input sequence, the output sequence, and a transmitted reference sequence. The gains are modified in the direction opposite to the estimated gradient.

More particularly, starting from arbitrary tap gain values, differences are found between the transmitted reference symbols and the signal samples at the equalizer output. Using these differences, in combination with the signals present at the equalizer input, the tap gains are modified to obtain the minimum mean square error. It can be shown that a tap gain configuration which minimizes the mean square error exists and is unique (see Gersho A., "Adaptive equalization of highly dispersive channels for data transmission", Bell System Technical Journal, 1969, 48, pp. 55–70).

When the optimum configuration has been reached the outputs of the receiver decision element, i.e. the self-decided symbols, are correct with very high probability and can be used instead of the reference symbols to obtain the present value of the error to be used in the adaptation algorithm. The basic assumption for the adaptive equalizer is therefore that the current output samples for the adaptive equalizer can be compared with the corresponding transmitted symbols, which have to be known a priori. However, if the channel characteristics change during transmission, the self-decided symbols may become incorrect and the equalizer is unable to reconfigure the tap gains to the new optimum values. In this case, to obtain reliable self-decided symbols at the receiver output, the above described start-up procedure must be repeated with considerable loss of time.

To remedy this serious drawback, self-learning or adaptive blind equalization methods, i.e. capable of converging in a configuration of limited distortion without the necessity of using a predetermined reference symbol sequence, have been proposed (see Y. Sato, "A method of self-recovering equalization for multi-level amplitude-modulation systems", IEEE Transaction on Communication, Vol. COM-23, N. 6, pp. 679–682, June 1975; D. N. Godard, "Self-recovering equalization and carrier tracking in two-dimensional data communication systems", IEEE Transaction on Communication, Vol. COM-28, N. 11, pp. 1867–1875, November 1980; A. Benveniste and M. Goursat, "Blind equalizers", IEEE Transaction on Communication, Vol. COM-32, N. 8, pp. 871–883, August 1984).

Another benefit of the blind convergence method is that there is no need for preliminary carrier phase recovery but this recovery can be accomplished in the blind convergence period even if during this period the decided symbols are mostly incorrect.

To minimize intersymbol interference these methods use new non-convex cost functions different than the mean square error used for the self-learning equalizer. Under weak conditions, these cost functions characterize the intersymbol interference sufficiently well while their stochastic minimization can be performed by using locally generated control signals with no knowledge of the transmitted data.

However, these methods of adaptive blind equalization are not fully satisfactory because they do not converge smoothly, and particularly because under steady state operating conditions they maintain a very high residual variance of the error signal. In other words, they do not reach the point of minimal intersymbol interference but oscillate continually around the minimum. This leads to operation under unacceptable working conditions.

SUMMARY OF THE INVENTION

The object of the present invention is to overcome the abovementioned drawbacks and to set forth an adaptive blind equalization method and device which, in the convergence phase, do not require a priori knowledge of the transmitted symbols, and which, in the steady state phase, ensure low probability of error on the self-decided symbols, and operate steadily under minimal intersymbol interference conditions.

In both phases the mean square error cost function is iteratively minimized by using the self-decided symbols, whether correct or not, provided they meet a specific reliability criterion. If this reliability criterion is met the self-decided symbols are used for adaptation, otherwise adaptation for that iteration is stopped. In other words a binary "consent" function is constructed that can take on the values of 0 and 1 and which tells whether the differences between the signal samples at the equalizer output and the corresponding self-decided symbols may be used or not in the self-decisional algorithm or if the algorithm must be stopped for that iteration. For example, in the case of a modulation system having two carriers in quadrature, the binary consent function is calculated for both axes.

The value of the binary consent function is obtained by comparing the sign of the difference between the signal sample and the corresponding self-decided symbol, which is the self-decided error, with the sign of a reference error. The reference error is obtained for each semiaxis from the difference between the signal sample at the equalizer output and a reference value selected on each semiaxis of the reference plane of the symbol constellation. If the signs of the two errors are the same, the binary consent function takes in the value 1 and the adaptation is performed. If they are different, it takes on the value 0 and the adaptation for that iteration is stopped.

The present method is based on the discovery that, if the axis reference values are properly selected, when the self-decided error and the reference error have equal sign, occurs the conditional probability that self-decided error and the true error (unknown) also have equal sign is higher than the unconditional probability of the same event. And this makes possible convergence of the system in a minimal intersymbol interference condition without knowing the signals transmitted and reduces the probability of error in the decided symbols under operating conditions.

Another benefit of the present blind equalization method is that carrier phase recovery is quicker than with conventional blind equalization methods. With conventional methods, a deteriorating transmission channel will cause loss of carrier synchronism while symbol transmission continues so that the equalizer is reset at a certain point. The equalizer is reactivated and synchronism of the carrier resumed only when the unequalized channel is improved to the point that the data received are correctly decided. Under the present method it is possible to resume synchronism of the carrier as soon as the channel is improved just enough to restart the blind convergence procedure regardless of the fact that many of the initial tap gains have poor values and that many of the received symbols are decided incorrectly. This means that the conditions of loss and resumption of synchronism of the carrier are nearly equal and occur for the same transmission channel conditions contrary to the known methods in which an improvement of the transmission channel is required to resume carrier synchronism.

To achieve the objectives the present invention uses a reception device comprising a filter with adaptable parameters and at the output of which there are signal samples, a decisional element which assigns to each signal sample a symbol, and a control device. On the basis of a pilot vector of the received signals, the signal samples, and the decided symbols, the control device regulates the adaptable parameters of the filter until an optimal configuration is reached and gives the minimal intersymbol interference. The optimal configuration of the filter parameters which gives the minimal intersymbol interference is obtained by minimizing a cost function using self-decided symbols of the decisional element without knowledge of the symbols actually transmitted and signal samples available at the filter output.

BRIEF DESCRIPTION OF THE DRAWINGS

Other objectives and benefits of the present invention will be made clear by the detailed description which follows and by the accompanying drawings in which.

DETAILED DESCRIPTION OF THE PREFERRED EMBODIMENT

Figure 1:
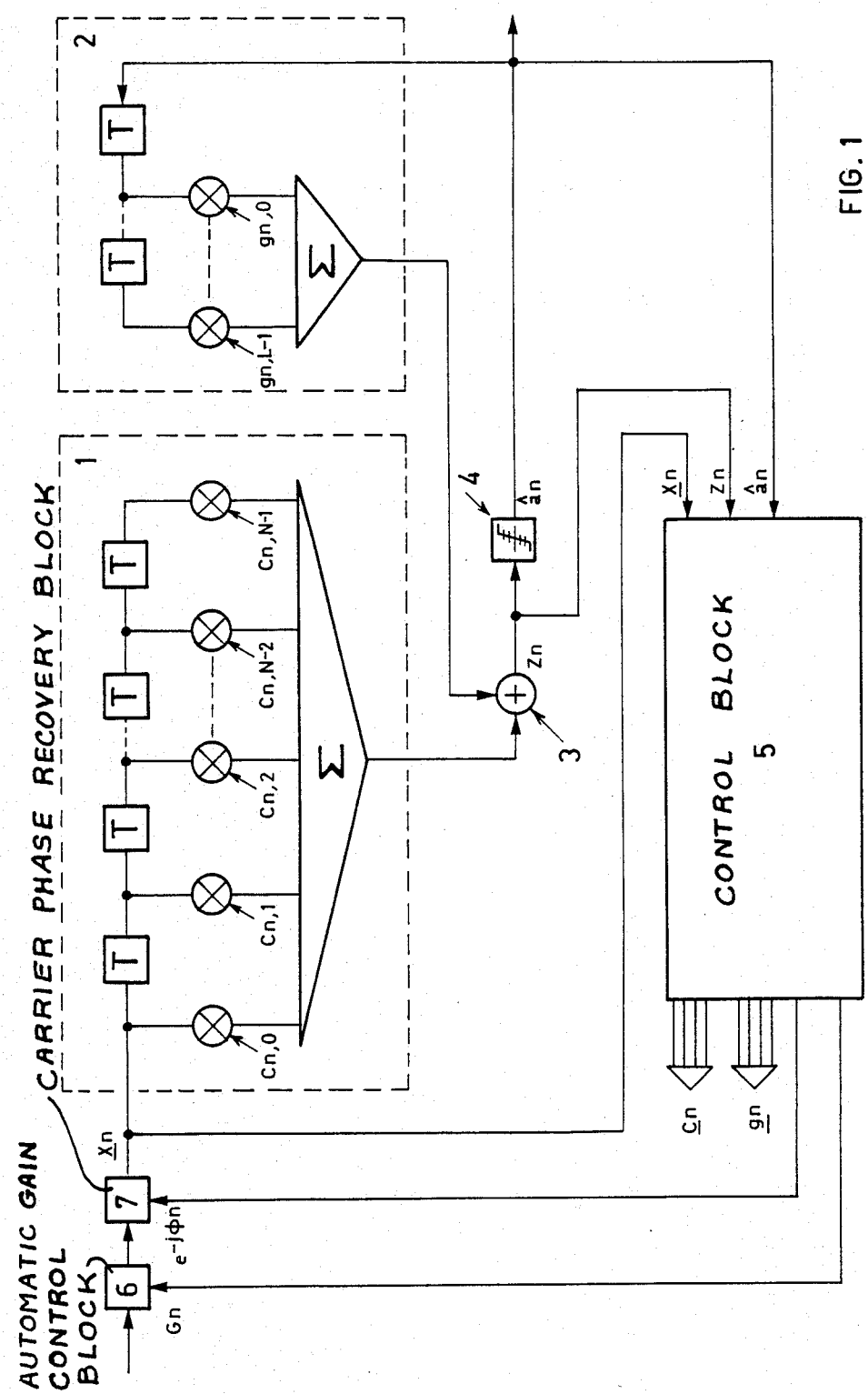
FIG. 1 shows a block diagram of a device which embodies the adaptive blind equalization method which is the object of the present invention.

With reference to FIG. 1 there is noted a feedforward equalization block 1, a decision feedback equalization block 2, an adding block 3, a decision block 4, a control block 5, an automatic gain control (AGC) block 6 and a carrier phase recovery block 7. The feedforward equalization block 1 and a decision feedback equalization block 2, the adding block 3 and the decision block 4 are well known and not described in detail. The carrier phase recovery block 7 maintains the phase of the sinusoidal wave form generated locally by a voltage-controlled oscillator (VCO) as consistent as possible with the received carrier phase. The automatic gain control block 6 maintains the signal amplitude at its output at a steady level. The control device 5, which will be described in detail below, has the purpose of regulating gain $G_n$ of the block AGC 6, the phase $\Phi_n$ of the wave form generated by the VCO and the tap gains $c_n$ and $g_n$ respectively of the direct equalization blocks 1 and decision feedback equalization block 2 in such a manner that an optimal value is reached for each of them on the basis of the selected cost function. The selected cost function for the present method, as mentioned above, is the mean square error.

Figure 2:
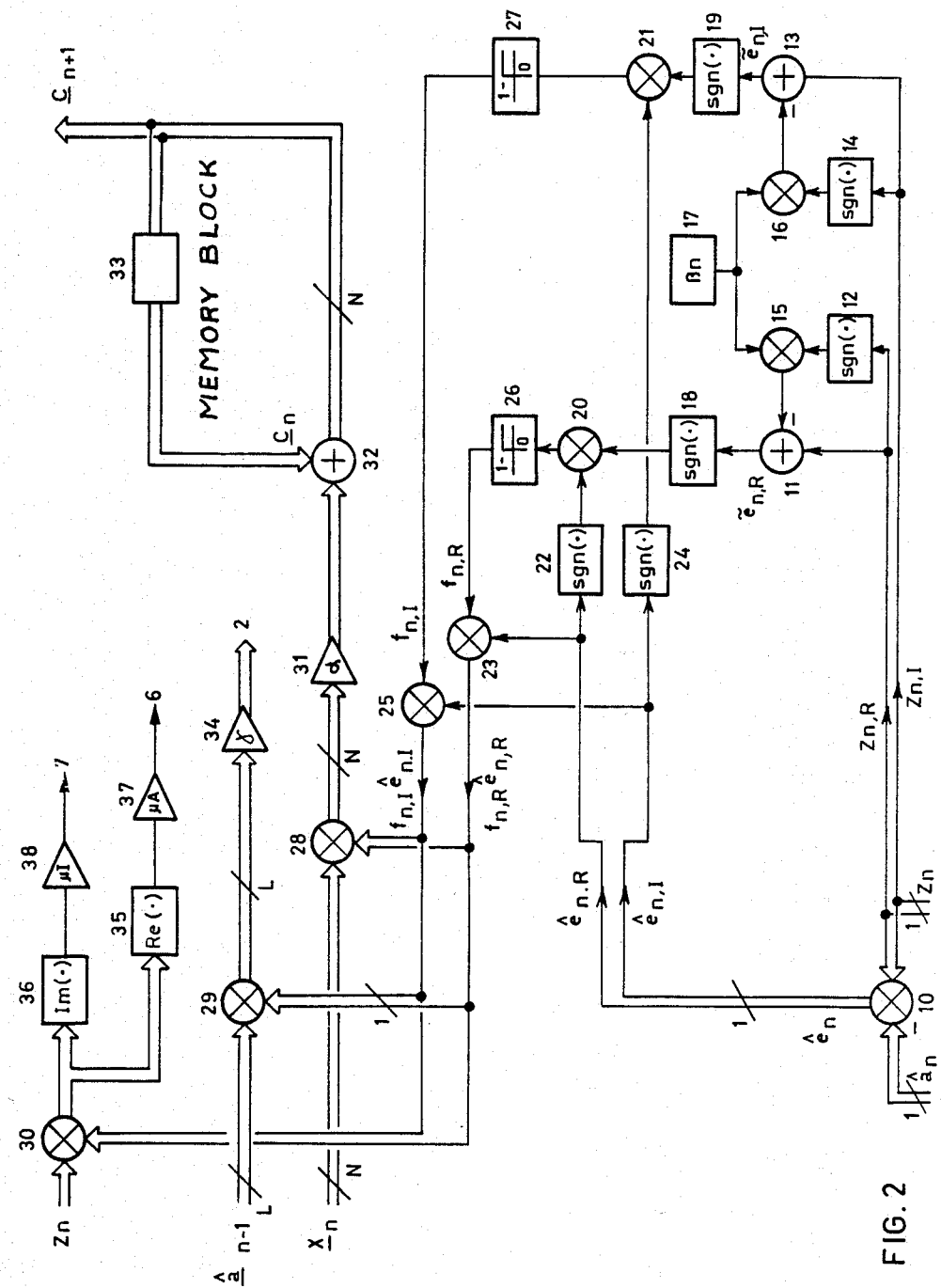
FIG. 2 shows a block diagram of the control device of FIG. 1, and FIGS. 3a and 3b show diagrams of a symbol constellation on an axis of a complex plane.

FIG. 2 which illustrates the control device 5 of FIG. 1 comprises an adder 10 accomplished for example with an operational amplifier at the inverting input of which arrives a complex self-decided symbol $\hat{a}_n = \hat{a}_{n,R} + j\hat{a}_{n,I}$, at the noninverting input of which arrives a complex signal sample (present at the output of the equalizer blocks 1 and 2) $z_n = z_{n,R} + jz_{n,I}$ and at the output of which there is a complex self-decided error sample $\hat{e}_n \hat{e}_{n,R} + j\hat{e}_{n,I}$. The real part $z_{n,R}$ of the complex signal sample $z_n$ reaches the noninverting input of an adder 11 and a sign calculation block 12 while the imaginary part $z_{n,I}$ of said signal reaches the noninverting input of an adder 13 and a sign calculation block 14. The adders 11 and 13 are accomplished in the same manner as the adder 10 and the sign calculation blocks 12 and 14 can be accomplished with nonfeedback operational amplifiers, used as high-gain comparators to an input of which can be sent the signal of which it is desired to calculate the sign while their other input can be connected to a fixed reference voltage so that their outputs there will be two signals which indicate the input magnitude signs, e.g. $+V$ or $-V$. Said signs are multiplied through two multipliers 15 and 16 by a real quantity $\beta_n$, generated by a block 17. The multipliers 15 and 16 are analog multipliers with four active or passive quadrants and the real quantity $\beta_n$ can be obtained by setting one of the multiplier inputs at a reference voltage. The output of the multipliers 15 and 16 are sent to the inverting inputs of the adders 11 and 13 respectively. The output signals of the adders 11 and 13 go to two sign calculation blocks 18 and 19 which are accomplished in a manner similar to the blocks 12 and 14. The output signals of the blocks 18 and 19 go to two multipliers 20 and 21 which are accomplished in a manner similar to the multipliers 15 and 16.

The real part $\hat{e}_{n,R}$ of the complex sample of the self-decided error $\hat{e}_n$ goes to a sign calculation block 22 and to a multiplier 23 while the imaginary part $\hat{e}_{n,I}$ of said error goes to a sign calculation block 24 and to a multiplier 25. The sign calculation blocks 22 and 24 are accomplished in a manner similar to the blocks 12 and 14 while the multipliers 23 and 25 are accomplished in a manner similar to the multipliers 15 and 16. The output signals of the blocks 22 and 24 go respectively to the multipliers 20 and 21.

The output signal of the multiplier 20 goes to a decision block 26 while the output signal of the multiplier 21 goes to a decision block 27. The decision blocks 26 and 27 can be accomplished with switches driven by the input signal in such a manner that when said signal is positive there is a voltage $+V$ at their outputs while when it is negative there is zero voltage. The outputs of the decision blocks 26 and 26 go to the multipliers 23 and 25 respectively.

The output of the multiplier 23 and the output of the multiplier 25 go to the multiplier blocks 28, 29 and 30.

At the multiplier block 28 which is made up of N multipliers in parallel also arrive N samples of a complex vector of the input signal, also referred to as the pilot vector, $\underline{x}_n = x_{n,R} + jx_{n,I}$. The output signals of the multiplier block 28 go to an amplifier block 31 made up of N amplifiers which amplify $\alpha$ times all the samples present at its input. The N complex samples thus amplified go to the inverting input of an adding block 32 made up of N adders similar to the adder 10 at the noninverting input of which also arrive the N complex samples accumulated in the previous iterations which were memorized in a memory block 33 made up for example of N capacitors.

The blocks 32 and 33 constitute an accumulator of which the output signals go to update the values of tap gains $c_n$ of the direct equalization block 1.

At the multiplier block 29 which is made up of L multipliers also arrives the vector of L self-decided complex symbols $\hat{a}_{n-1} = \hat{a}_{n-1,R} + j\hat{a}_{n-1,I}$, which will be defined below. The output signals of the multiplier block 29 go to an amplifier block 34 which is made up of L amplifiers which amplify $\gamma$ times all the input signals. Through an accumulator circuit similar to that illustrated for the input signal samples $x_n$, not illustrated in the figures, the amplified L signals then go to update the values of the tap gains $g_n$ of the decision feedback equalization block 2.

To the multiplier block 30 which is made up of a single multiplier also arrives the complex signal sample present at the output of the equalizer blocks 1 and 2 $z_n = z_{n,R} + jz_{n,I}$. The output signal of the multiplier block 30 goes to a real part separation block 35 and to an imaginary part separation block 36. The output of the block 35 goes to an amplifier 37 which amplifies $\mu_R$ times the input signal. The amplified signal then goes through an accumulator circuit similar to that illustrated above for the input signal samples $x_n$, not illustrated in the figures, to update the value of the gain $G_n$ of the automatic gain control block 6. The output of the block 36 goes to an amplifier 38 which amplifies $\mu_I$ times the signal at its input. Through an accumulator circuit similar to that illustrated above for the input signal samples $x_n$, not illustrated in the figures, the amplified signal then goes to update the value of the phase $\Phi_n$ of the local oscillator of the block 7.

Since they must work with complex signals, i.e. made up of a real part and an imaginary part, the multipliers 32, 28, 29 and 30 and the adder 10 are in reality dual multipliers and adders.

The control device 5 just described is suitable for analog signals. If the signals were digital, i.e. represented by K-bit binary numbers, the adders 10, 11, 13 and 32 could be accomplished with binary adders, the multipliers 15, 16, 23, 25, 28, 29 and 30 with digital binary multipliers, the multipliers 20 and 21 with multiplexers, the sign calculation blocks 12, 14, 18, 19, 22 and 24 could be replaced by the most significant bit of the K bits of the signal, the decision blocks 26 and 27 could be eliminated, the amplifier blocks 31, 34, 37 and 38 could multiply the input signal by a constant quantity by shifting K bits, and the memory block 33 could be accomplished with flip-flops. In addition, all or part of the aforesaid blocks could be implemented in one or more integrated circuits.

Figure 3A:
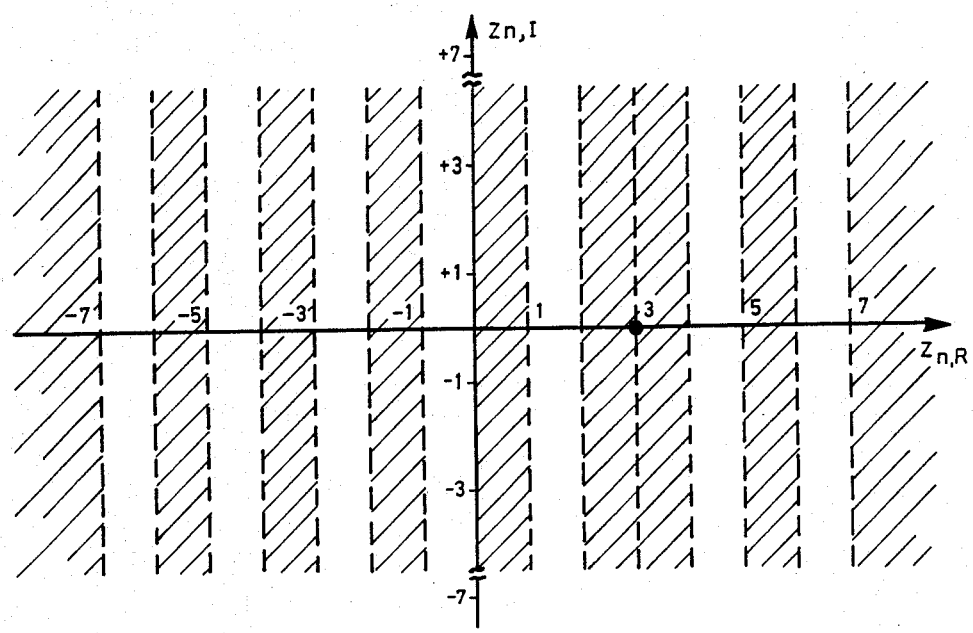
Figure 3B:
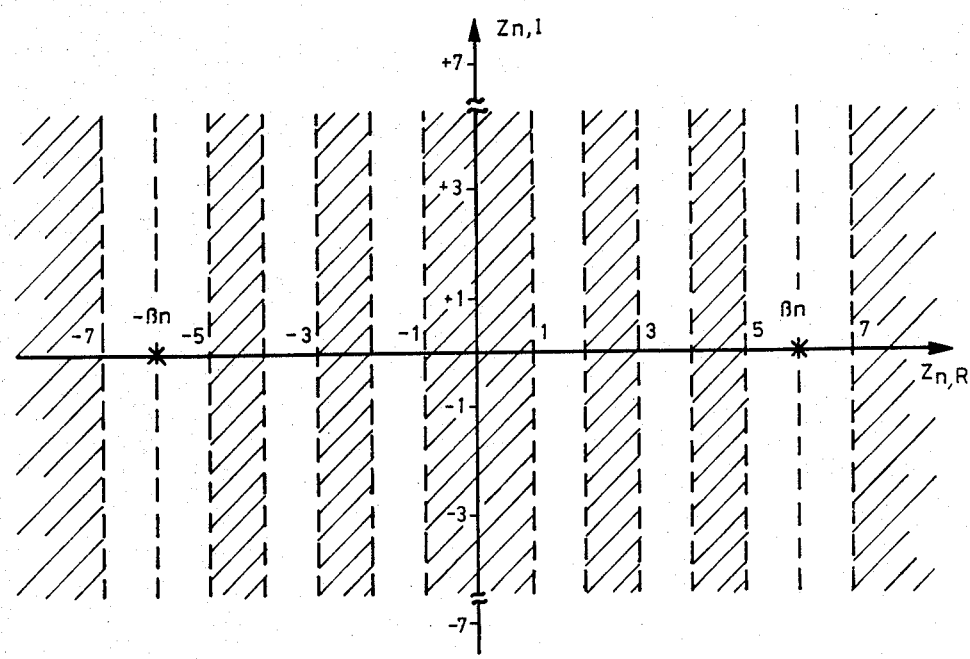

FIGS. 3a and 3b illustrate the complex plane of the symbol constellation for a 64 QAM transmission, i.e. utilizing 64 symbols and two amplitude-modulated quadrature carriers. In particular in FIG. 3a the areas indicated with broken lines are the region $R_1$ of the plane in which the sign of the self-decided error $\hat{e}_{n,R}$ is equal to the sign of the real part of the true error $e_{n,R}$ multiplied by a transmitted symbol of which the real part $a_{n,R}$ is 3 while in FIG. 3b the broken-line areas indicate the region $R_{op}$ of the space in which the signal of the real part of the self-decided error $\hat{e}_{n,R}$ is equal to the sign of the real part of the reference error $\tilde{e}_{n,R}$ when $\beta_n$ is equal for example to 6.

To explain the adaptive blind equalization method which is the object of the present invention it is recalled that $\underline{x}_n$ indicates the complex vector or pilot vector of the input signals to the direct equalizer block 1 and $s_n$ the complex sample of the output signal block 1 at the instant nT when n is the nth iteration and T is the sampling time. In the self-decision adaptation method for the tap gains of the feedforward equalization block $\underline{c}_n$ with decision feedback $\underline{g}_n$, for the AGC gain $G_n$, and for the $\Phi_n$ phase of the carrier the following relationships apply.

$$\underline{c}_{n+1} = \underline{c}_n - \alpha \hat{e}_n \underline{x}_n \tag{1}$$

$$\underline{g}_{n+1} = \underline{g}_n - \gamma \hat{e}_n \hat{\underline{a}}_{n-1} \tag{2}$$

$$G_{n+1} = G_n - \mu_R(\hat{e}_{n,R} z_{n,R} + \hat{e}_{n,I} z_{n,I}) \tag{3}$$

$$\Phi_{n+1} = \Phi_n - \mu_I(-\hat{e}_{n,R} z_{n,I} + \hat{e}_{n,I} z_{n,R}) \tag{4}$$

where as mentioned above $$\hat{e}_n \triangleq \hat{e}_{n,R} + j\hat{e}_{n,I} \triangleq z_n - \hat{a}_n \triangleq (z_{n,R} - \hat{a}_{n,R}) + j(\hat{a}_{n,I} - z_{n,I}) \tag{5}$$

is the self-decided complex error and $$\hat{\underline{a}}_{n-1} \triangleq (\hat{a}_{n-1} \hat{a}_{n-2} \ldots \hat{a}_{n-L}) \tag{6}$$

is the complex input vector with L dimensions of the decision feedback equalization block 2. $\alpha$, $\gamma$, $\mu_R$ and $\mu_I$ are real values for the adaption steps, which can be vary with each iteration $n$.

Under high distortion conditions many of the self-decided symbols $\hat{a}_n$ are incorrect and hence the adaptation method described by equations 1-4 does not converge to an optimal value of its parameters and the system does not work well as would happen if in place of the self-decided symbols $\hat{a}_n$ the true symbols $a_n$ were used. A quantity strictly correlated with the behavoir of the system is the following probability.

$$p_n = P\{\text{sgn } \hat{e}_{n,R} = \text{sgn } e_{n,R}\} = P\{\text{sgn } \hat{e}_{n,I} = \text{sgn } e_{n,I}\} \quad (7)$$

where $$e_n \triangleq e_{n,R} + je_{n,I} \triangleq z_n - a_n \quad (8)$$

is the true error at time nT.

When the self-decided error sign is equal to the true error sign the corrections made in the equations 1-4 go in the right direction and in this case with an appropiate selection of the values of the adjustment steps which accounts for the difference amplitudes of the true error $e_n$ and of the self-decided error $\hat{e}_n$ the total correction based on the self-decided error $\hat{e}_n$ gives substantially the same result as the one based on the true error $e_n$.

But in the self-decision method the probability $p_n$ of equation 7 under high-distortion conditons is too low and cannot give convergence. To calculate this probability the probability density $f_{zR}(z)$ of $z_R$ [or $f_{zI}(z)$ of $z_I$] is integrated on the appropiate intervals of the axis $z_r$ (or $z_I$):

$$p_n = \Sigma_{S_i \in A} \int_{R_i} f_{zR}(z|a_{n,R}=S_i)dz P\{a_{n,R}=S_i\} \quad (9)$$

where A is the alphabet of the transmitted symbols and $R_i$ is the region of the axis $z_{n,R}$ where the event {sgn $\hat{e}_{n,R}$ = sgn $\hat{e}_{n,R}$ | $a_{n,R}$ = $S_i$} occurs. An example for $a_{n,R}=3$ is shown in FIG. 3a.

The object of the invention is to identify certain intervals of the axis $z_{n,R}$ (or $z_{n,I}$) which favour the adaptation and exclude others. Regardless of the transmitted symbols $a_{n,R}$ appropriate selection of a region $R_{op}$ on the axis $z_{n,R}$ (or $z_{n,I}$) considerably increases the probability $p_n$ of eqaution 9 in the adaptation method based on self-decisions each time the equalizer output signal samples $z_{n,R}$ (or $z_{n,I}$) belong to the region $R_{op}$ identified. When this event occurs the adaptation proceeds but when neither $z_{n,R}$ nor $z_{n,I}$ belong to the region $R_{op}$ the adaptation is stopped for that iteration. In other words if $z_{n,R}$ belongs to the region $R_{op}$ identified while $z_{n,I}$ does not belong to it the adaptation proceeds for the real part and is stopped for the imaginary part and vice versa. In a first variant it can be provided that the adaptation proceed only when both the real part $z_{n,R}$ and the imaginary part $z_{n,I}$ of the $z_n$ signal belong simultaneously to the region $R_{op}$ identified.

Before describing how the region $R_{op}$ can be identified it should be recalled that the maximum level error (MLE) technique (see R. Yatsuboshi, N. Sata, K. Aoki, "A convergence of automatic equalizer by maximum level error control", National Conversion Record, IECE of Japan, N. 2192, 1974) uses for the adaptation only those signal samples $z_{n,R}$ (or $z_{n,I}$) such that $|z_{n,R}|>7$ (or $|z_{n,I}|>7$). These values of the received signal samples have the property that the calculated error in relation to the decided symbols is sure to have the same sign as the true error. Therefore this technique could be used for our purposes but the probability that the events $\{|z_{n,R}|>7\}$ or $\{|z_{n,I}|>7\}$ occur in the transmission with 64 QAM is very low and the convergence would be extremely slow.

In accordance with the present invention there is generated a complex reference error $\bar{e}_n$ of which the real and imaginary parts are $$\bar{e}_{n,R} = z_{n,R} - (\text{sgn } z_{n,R})\beta_n \quad (10)$$

$$\bar{e}_{n,I} = z_{n,I} - (\text{sgn } z_{n,I})\beta_n$$

where $\beta_n$ is an appropriate real value which can vary with each iteration n. $\beta_n$ can conveniently be selected by maximizing the probability $p_n$ of equation 9 or by computer simulation.

The purpose of the reference errors $\bar{e}_{n,R}$ and $\hat{e}_{n,I}$ is only to determine the zones of the axes $z_R$ and $z_I$ in which the self-decided errors $\hat{e}_{n,R}$ and $\hat{e}_{n,I}$ of the self-decided symbols $\hat{a}_{n,R}$ and $\hat{a}_{n,I}$ are sufficiently reliable for adaptation. More particularly equations 1 to 4 are modified as follows:

$$\underline{c}_{n+1,R} = \underline{c}_{n,R} - \alpha(f_{n,R}\hat{e}_{n,R}\underline{x}_{n,R} - f_{n,I}\hat{e}_{n,I}\underline{x}_{n,I}) \quad (11)$$

$$\underline{c}_{n+1,I} = \underline{c}_{n,I} - \alpha(f_{n,R}\hat{e}_{n,R}\underline{x}_{n,I} + f_{n,I}\hat{e}_{n,I}\underline{x}_{n,R})$$

$$\underline{g}_{n+1,R} = \underline{g}_{n,R} - \gamma(f_{n,R}\hat{e}_{n,R}\underline{\hat{a}}_{n-1,R} - f_{n,I}\hat{e}_{n,I}\underline{\hat{a}}_{n-1,I}) \quad (12)$$

$$\underline{g}_{n+1,I} = \underline{g}_{n,I} - \gamma(f_{n,R}\hat{e}_{n,R}\underline{\hat{a}}_{n-1,I} + f_{n,I}\hat{e}_{n,I}\underline{\hat{a}}_{n-1,R})$$

$$G_{n+1} = G_n - \mu_R(f_{n,R}\hat{e}_{n,R}z_{n,R} + f_{n,I}\hat{e}_{n,I}z_{n,I}) \quad (13)$$

$$\Phi_{n+1} = \Phi_n - \mu_I(-f_{n,R}\hat{e}_{n,R}z_{n,I} + f_{n,I}\hat{e}_{n,I}z_{n,R}) \quad (14)$$

where $f_{n,R}$ and $f_{n,I}$ are the real and imaginary parts respectively of a complex binary consent function $\underline{f}_n$ which take on the following values $$f_{n,R} = 1 \text{ se sgn } \hat{e}_{n,R} = \text{sgn } \bar{e}_{n,R} \quad (15)$$

$$f_{n,R} = 0 \text{ se sgn } \hat{e}_{n,R} \neq \text{sgn } \bar{e}_{n,R}$$

$$f_{n,I} = 1 \text{ se sgn } \hat{e}_{n,I} = \text{sgn } \bar{e}_{n,I} \quad (16)$$

$$f_{n,I} = 0 \text{ se sgn } \hat{e}_{n,I} \neq \text{sgn } \bar{e}_{n,I}$$

and narrow the field of application of the equations 1-4 to only the region $R_{op}$ in which the self-decided errors $\hat{e}_{n,R}$ and $\hat{e}_{n,I}$ are very reliable. The region $R_{op}$ for the axis $z_{n,R}$ for a 64 QAM transmission and for $\beta_n=6$ is illustrated in FIG. 3b.

The probability of the equation 7 now becomes $$\begin{aligned} P_n &= P\{\text{sgn } \hat{e}_{n,R} = \text{sgn } e_{n,R} \mid \text{sgn } \hat{e}_{n,R} = \text{sgn } \bar{e}_{n,R}\} \\ &= P\{\text{sgn } \hat{e}_{n,I} = \text{sgn } e_{n,I} \mid \text{sgn } \hat{e}_{n,I} = \text{sgn } \bar{e}_{n,I}\} \end{aligned} \quad (17)$$

and it is considerably higher than that of said equation 7, which guarantees convergence.

The speed of convergence depends on the conditioned probability that the events of equation 17 will occur and this given by $$P_{go} = P[\{\text{sgn } \hat{e}_{n,R} = \text{sgn } \bar{e}_{n,R}\} U \{\text{sgn } \hat{e}_{n,I} = \text{sgn } \bar{e}_{n,I}\}] \quad (18)$$

and the method described by equations 11-14 reaches an excellent compromise between probability $p_n$ that the correction when it occurs will have the right sign and probability $P_{go}$ that it will really occur thus producing smoothness and speed of said convergence.

The convergence method described by equations 11-14 for each iteration comprises the following operations: (1) construction of the self-decided error $\hat{e}_n$, (2) construction of the binary consent function $f_n$, and (3) correcting of the values of $\underline{c}_{n,R}$, $\underline{c}_{n,I}$, $\underline{g}_{nR}$, $\underline{g}_{n,I}$, $G_n$ and $\phi_n$.

More particularly, with reference to the figures the method is accomplished in the following manner: to the inverting input of the adder 10 is sent the complex self-decided symbol $\hat{a}_n = \hat{a}_{n,R} + j\hat{a}_{n,I}$, while to the noninverting input of the adder 10 is send a complex signal sample (present at the output of the equalizer blocks 1 and 2) $z_n = z_{n,R} + jz_{n,I}$ so that at the output of the adder 10 there will be a complex self-decided error sample $\hat{e}_n = \hat{e}_{n,R} + j\hat{e}_{n,I}$. The real part $z_{n,R}$ of the complex signal sample $z_n$ reaches the noninverting input of the adder 11 and the sign calculation block 12 while the imaginary part $z_{n,I}$ of said sign reaches the noninverting input of the adder 13 and the sign calculation block 14. The signals taken from the blocks 12 and 14 through the multipliers 15 and 16 are multiplied by a real quantity $\beta_n$ generated by the block 17. In particular this quantity instead of varying with each iteration could be fixed and always take on the same value $\beta$. The output signals of the multipliers 15 and 16 are sent respectively to the inverting inputs of the adders 11 and 13. The output signals of the adders 11 and 13, which represent the real part $\overline{e}_{n,R}$ and the imaginary part $\overline{e}_{n,I}$ respectively of the reference error $\overline{e}_n$ go to the two sign calculation blocks 18 and 19. The output signals of blocks 18 and 19, which represent the signs of the real part $\overline{e}_{n,R}$ and of the imaginary part $\overline{e}_{n,I}$ of the reference error $\overline{e}_n$, go to the multipliers 20 and 21.

The real part $\hat{e}_{n,R}$ of the complex sample of the self-decided error $\hat{e}_n$ goes to the sign calculation block 22 and to the multiplier 23 while the imaginary part $\hat{e}_{n,I}$ of said error goes to the sign calculation block 24 and to the multiplier 25. The output signals of the blocks 22 and 24 which represent the signs of the real part $\hat{e}_{n,R}$ and of the imaginary part $\hat{e}_{n,I}$ of the complex sample of the self-decided error $\hat{e}_n$ go respectively to the multipliers 20 and 21.

The output signal of the multiplier 20, which represents the product of the signs of the real part $\hat{e}_{n,R}$ of the self-decided error $\hat{e}_n$ and of the real part $\overline{e}_{n,R}$ of the reference error $\overline{e}_n$ goes to the decision block 26 while the output signal of the multiplier 21 which represents the product of the signs of the imaginary part $\hat{e}_{n,I}$ of the self-decided error $\hat{e}_n$ and of the imaginary part $\overline{e}_{n,I}$ of the reference error $\overline{e}_n$ goes to the decision block 27. On the basis of the input signal the decision blocks 26 and 27 generate two binary functions so that when said input signal is positive there is a 1 at their outputs while when it is negative there is a 0. The outputs of the decision blocks 26 and 27 which represent respectively the real part $f_{n,R}$ and the imaginary part $f_{n,I}$ of the binary consent function $f_n$ go to the multipliers 23 and 25.

The output of the multiplier 23 which is the product of the real part $f_{n,R}$ of the binary consent function $f_n$ and of the real part $\hat{e}_{n,R}$ of the self-decided error $\hat{e}_n$ and the output of the multiplier 25 which is the product of the imaginary part $f_{n,I}$ of the binary consent function $f_n$ and of the imaginary part $\hat{e}_{n,I}$ of the self-decided error $\hat{e}_n$ go to the multiplier blocks 28, 29 and 30.

At the multiplier block 28 also arrive N samples of a complex vector of an input signal or pilot vector $\underline{x}_n = \underline{x}_{n,R} + j\underline{x}_{n,I}$. The output signals of the multiplier block 28, which are present or not depending on the value of the binary consent function $f_n$, go to the amplifier block 31 which amplifies $\alpha$ times all the samples present at its input. The N complex samples thus amplified go to the inverting input of the adder block 32, to the noninverting input of which also arrive the N amplified complex samples of the previous iteration which were memorized in the memory block 33. The output signals of the adder block 32 which represent the difference between the N present samples and the N samples of the previous iteration go to update the values of the tap gains $\underline{c}_n$ of the feedforward equalization block 1.

At the multiplier block 29 also arrive L self-decided complex symbols $\hat{a}_{n-1} = \hat{a}_{n-1,R} + j\hat{a}_{n-1,I}$. The output signals of the multiplier block 29 which are also present or not depending on the value of the binary consent function $f_n$ go to the amplifier block 34 which amplifies $\gamma$ times the signals present at its input. Through a circuit similar to the one illustrated above for the input signal samples $\underline{x}_n$ which is not illustrated in the figures the L amplified signals then go to update the values of the tap gains $\underline{g}_n$ of the decision feedback equalization block 2.

At the multiplier block 30 also arrives a complex sample of the signal $z_n = z_{n,R} + jz_{n,I}$ which is present at the output of the equalizer blocks 1 and 2. The output signal of the multiplier block 30 which is also present or not depending on the value of the binary consent function $f_n$ goes to the separation block of the real part 35 and to the separation block of the imaginary part 36. The output of the block 35 goes to the amplifier 37 which amplifies $\mu_R$ times the signal present at its input. The amplified signal then through a circuit similar to that illustrated above for the input signal $\underline{x}_n$ which is not illustrated in the figure goes to update the value of the gain $G_n$ of the automatic gain control block 6. The output of the block 36 goes to the amplifier 38 which amplifies $\mu_I$ times the signal present at its input. Through a circuit similar to that illustrated above for the input signal samples $\underline{x}_n$ which is not illustrated in the figures the amplified signal then goes to update the value of the phase $\phi_n$ of the local oscillator VCO of the block 7.

In this manner iteration after iteration the values of the tap gains $c_{n,R}$ and $c_{n,I}$ of the feedforward equalization block 1 and of the tap gains $g_{n,R}$ and $g_{n,I}$ of the decision feedback equalization block 2, the value $G_n$ of the gain of the AGC block 6 and the value $\phi_n$ of the local oscillator phase of the block 7 are adjusted until they reach their optimal value.

It should be noted that the convergence method described uses the self-decided symbols $\hat{a}_n$ so that once adaptation is obtained there are the optimal conditions for correct decision of the symbols under steady state conditions without having to pass from one method to another from the convergence phase to the steady state phase.

The present method has been described for a synchronous transmission of the signals, i.e. in which the sampling time and the delay introduced by each of the delay lines of the feedforward equalization blocks 1 and decision feedback blocks 2 are equal to the symbol transmission time T, but it is perfectly applicable with no significant change as well to a so-called fractionary equalization system, i.e. in which the delay introduced by each delay line in the feedforward equalization block and hence the sampling time at the receiver is smaller than the symbol transmission time T, e.g. half.

The method is also fully applicable to an equalization system in which a single equalization block is used and in which it is not desired to recover the carrier phase, i.e. in which the block 1 or 2 and the blocks 6 and 7 might be missing.

Among the many other possible variants of the described method may be mentioned (1) use of the self-decided error for optimization of a cost function different from that of the mean square error as for example peak distortion in the so-called "zero forcing" equalizer, (2) limitation in amplitude of the individual components of the pilot vector $\underline{x}_n$ by means of a limiter so that said components remain within certain limits, (3) use of the vector "of the signs of $\underline{x}_n$" in place of said pilot vector $\underline{x}_n$ by means of a sign calculation block (the two variants just mentioned allow simplification of manufacturing with nearly the same convergence speed), and (4) use of the self-decided error sign $\hat{e}_n$ in place of said self-decided error $\hat{e}_n$ by means of a sign calculation block.

From the description given the benefits of the adaptive blind equalization method and device which are the object of the present invention are clear. In particular they lie in the fact that said self-decision method is used both in the convergence phase and under steady state conditions regardless of whether the self-decided symbols are correct or not, the fact that said method ensures good and smooth adaptation in the convergence phase even with incorrect self-decided symboles, the low probability of error of the decided symbols under steady state conditions, the fact that recovery of the carrier phase is very fast even with incorrect self-decided symbols, and the fact that it is possible to receive the symbols correctly even under initial channel transmission conditions worse than in the known art.

It is clear that numerous variants to the adaptive blind equalization device are possible for persons skilled in the art in addition to the methods described as examples herein without thereby exceeding the scope of the novelty principles of the invention.

We claim:

1. An adaptive blind equalization method for reception of electrical signals codified into symbols and transmitted on a transmission channel of unknown characteristics that are variable in time and introduce intersymbol interference comprising the steps of:
   delaying said symbols with a chain of delay elements;
   multiplying delayed symbols with adaptable parameters;
   adding delayed and multiplied symbols to obtain signal samples;
   assigning a decided symbol to each signal sample using a decision process; and
   adjusting said adaptable parameters to obtain minimum intersymbol interference, said adjusting step including the steps of:
   minimizing a cost function to determine an optimal configuration of said adaptable parameters.
   determining if a reliability criterion is met, and
   implementing said optimal configuration when said reliability criterion is met.

2. A method according to claim 1 wherein said cost function uses a mean square error that exists between said decided symbols and said signal samples.

3. A method according to claim 1 wherein said cost function uses a peak distortion that exists between said decided symbols and said signal samples.

4. A method according to claim 1 wherein said delaying step successively delays for a period equal to a signal transmission time to produce a synchronous signal equalization.

5. A method according to claim 1 wherein said delaying step successively delays for a period smaller than a signal transmission time, thus producing an equalization of signals with fractionary spacing cells.

6. A method according to claim 5 wherein said delaying step successively delays for a period equal to half said signal transmission time.

7. A method according to claim 1 wherein said reliability criterion of said determining step is a binary consent function.

8. A method according to claim 7 wherein said binary consent function compares a sign of decided error with a sign of a reference error.

9. A method according to claim 8 wherein said decided error is a difference between said signal samples and said decided symbols and said reference error is a difference between said signal samples and a reference point of said decided symbols.

10. A method according to claim 1 wherein said electrical signals are transmitted on two carriers at the same frequency.

11. A method according to claim 10 wherein said carriers are in quadrature.

12. A method according to claim 11 wherein said carriers in quadrature are amplitude modulated.

13. A method according to claim 7 wherein said binary consent function has a real part and an imaginary part.

14. A method according to claim 13 wherein said real part and imaginary part of said binary consent function independently provide for adaptation of the real part and the imaginary part, respectively, of the adaptable parameters.

15. A method according to claim 14 wherein said real part and said imaginary part of said binary consent function must both consent for adaptation of the real part and the imaginary part, respectively, of the adaptable parameters.

16. A method according to claim 13 wherein:
   said real part of the binary consent function is constructed by comparing a sign of the real part of a decided error with a sign of the real part of a reference error, and
   said imaginary part of the binary consent function is constructed by comparing a sign of the imaginary part of a decided error with a sign of the imaginary part of a reference error.

17. A method according to claim 16 wherein:
   said sign of the real part of the decided error is a difference between the real part of said signal samples and the real part of said decided symbols,
   said sign of the imaginary part of the decided error is a difference between the imaginary part of said signal samples and the imaginary part of said decided symbols,
   the real part of the reference error is a difference between the real part of said signal samples and a reference point of the symbol constellation plane, and
   the imaginary part of the reference error is a difference between the imaginary part of said signal samples with said reference point of the symbol constellation plane.

18. A method according to claim 1 further including the step of adjusting second adaptable parameters by feedback filtering to further minimize said cost function and obtain minimal intersymbol interference.

19. A method according to claim 1 further including the steps of:
automatically controlling a gain of said symbols before said delaying step; and
recovering a carrier phase of said symbol after said gain control step and before said delaying step.

20. An adaptive blind equalization apparatus for reception of electrical signals codified into symbols and transmitted on a transmission channel of unknown characteristics that are variable in time and introduce intersymbol interference comprising;
first means for delaying said symbols with a chain of delay elements;
first means for multiplying delayed symbols with adaptable parameters;
first means for adding delayed and multiplied symbols to obtain signal samples;
means for assigning a decided symbol to each signal sample using a decision process; and
means for adjusting said adaptable parmeters to obtain minimum intersymbol interference, said adjusting means including:
means for minimizing a cost function to determine an optimal configuration of said adaptable parameters,
control means for determining if a reliability criterion is met, and
means for implementing said optimal configuration of said adaptable parameters when said reliability criterion is met.

21. An apparatus according to claim 20 wherein said reliability criterion of said control means is a binary consent signal that is input to a first multiplier in said control means.

22. An apparatus according to claim 20 further including:
feedback means for further minimizing said cost function, sad feedback means including:
second means for delaying said decided symbols,
second means for multiplying said delayed decided symbols with second adaptable parameters,
second means for adding said delayed decided symbols, and
third means for adding said delayed decided symbols and said delayed symbols; and wherein
said adjusting means further includes means for adjusting said second adaptable parameters to obtain minimum intersymbol interference.

23. An apparatus according to claim 22 wherein:
said minimizing means minimizes said cost function to determine an optimal configuration of said first adaptable parameters,
said control means determines if said reliability criterion is met, and
said implementing means implements said optimal configuration of said second adaptable parameters when said reliability criterion is met using a second multiplier.

24. An apparatus according to claim 20 further including:
means for controlling gain of said symbols;
means for recovering a carrier phase of said symbols; and wherein said implementing means enables or inhibits said gain controlling means and said carrier phase recovering means using a first multiplier and said reliability criterion.

25. An apparatus according to claim 24 wherein said reliability criterion is a binary consent signal generated by a second multiplier.

26. An apparatus according to claim 25 wherein said second multiplier receives at a first input a decided error signal coming from a first adder and at a second input a binary consent function coming from a first decision block.

27. An apparatus according to claim 26 wherein said first decision block receives at its input the output signal of a third multiplier which in turn receives at its input the output signals of a first and second sign calculation block.

28. An apparatus according to claim 27 wherein said first sign calculation block receives at its input a reference error signal generated by a second adder.

29. An apparatus according to claim 28 wherein said second adder receives at its noninverting input said signal samples and at its inverting input the output signal of a fourth multiplier.

30. An apparatus according to claim 29 wherein said fourth multiplier receives at its inputs a real quantity output of a third sign calculation block and the output of a block generator.

31. An apparatus according to claim 30 wherein said third sign calculation block receives at its input said signal samples.

32. An apparatus according to claim 26 wherein said first adder receives at an inverting input said decided symbols and at its noninverting input said signal samples.

33. An apparatus according to claim 32 wherein said binary consent signal is made up of a real part generated by a third multiplier and an imaginary part generated by a fourth multiplier.

34. An apparatus according to claim 33 wherein:
said third multiplier receives at a first input a real part of a decided error from a second adder and at a second input a real part signal of said binary consent function from said first decision block, and
said fourth multiplier receives at a first input an imaginary part of said decided error from said first adder and at a second input an imaginary part of said binary consent function from a second decision block.

35. An apparatus according to claim 34 wherein:
said first decision block receives at its input the output signal of a fifth multiplier, which, in turn, receives at its inputs the output signals of a first and a second sign calculation block, and
said second decision block receives at its input the output signal of a sixth multiplier which in turn receives at its inputs the output signals of a third and a fourth sign calculation block.

36. An apparatus according to claim 35 wherein:
said first sign calculation block receives at its input a real part of a reference error generated by a third adder, and
said fourth sign calculation block receives at its input an imaginary part of a reference error generated by a fourth adder.

37. An apparatus according to claim 36 wherein:
said third adder receives at its noninverting input the real part of said signal samples and at its inverting input the output signal of a seventh multiplier, and
said fourth adder receives at its noninverting input the imaginary part of said signal samples and at its inverting input the output signal of an eighth multiplier.

38. An apparatus according to claim 37 wherein:
said seventh multiplier receives at its inputs the output of a fifth sign calculation block and a real quantity output of a block generator, and
said eighth multiplier receives at its inputs the output of a sixth sign calculation block and said real quantity of said block generator.

39. An apparatus according to claim 38 wherein:
said fifth sign calculation block receives at its input the real part of said signal samples, and
said sixth sign calculation block receives at its input the imaginary part of said signal samples.

40. An apparatus according to claim 26 wherein said first adder receives at its inverting input a real part and an imaginary part of said decided symbols and at its noninverting input a real part and an imaginary part of said signal samples and generates at its output a decided error signal having a real part and an imaginary part.

41. An apparatus according to claim 21 wherein said first multiplier receives at one of its inputs an amplitude limited pilot vector.

42. An apparatus according to claim 21 wherein said first multiplier receives at one of its inputs a pilot vector and upstream from said first multiplier is inserted a first sign calculation block that extracts the pilot vector sign.

43. An apparatus according to claim 39 wherein upstream from said fourth multiplier is inserted seventh sign calculation block which extracts the decided error sign.

* * * * *

UNITED STATES PATENT AND TRADEMARK OFFICE
CERTIFICATE OF CORRECTION

PATENT NO. : 4,847,797

DATED : July 11, 1989

INVENTOR(S) : Giorgio PIICHI and Giancarlo PRATI

It is certified that error appears in the above-identified patent and that said Letters Patent is hereby corrected as shown below:

ON THE TITLE PAGE:

Please change "[73] Assignee: GTE Telecommicazioni S.P.A., Milan, Italy" to --SIEMENS Telecomunicazioni S.p.A., Milano, Italy--.

Signed and Sealed this

Twenty-fourth Day of July, 1990

Attest:

HARRY F. MANBECK, JR.

Attesting Officer

Commissioner of Patents and Trademarks